US006027810A

United States Patent [19]

Dahlquist et al.

[11] Patent Number: 6,027,810

[45] Date of Patent: Feb. 22, 2000

[54] RADIOGRAPHIC INTENSIFYING SCREEN WITH ANTISTAT

[75] Inventors: John C. Dahlquist, Maplewood; Subodh K. Kulkarni, Woodbury, both of Minn.

[73] Assignee: Minnesota Mining & Manufacturing, St. Paul, Minn.

[21] Appl. No.: 08/871,179

[22] Filed: Jun. 9, 1997

Related U.S. Application Data

[60] Continuation of application No. 08/658,768, Jun. 5, 1996, abandoned, which is a division of application No. 08/319, 812, Oct. 7, 1994, Pat. No. 5,569,485.

[51] Int. Cl.[7] .................................. G01J 1/58; B32B 1/18

[52] U.S. Cl. .......................... 428/409; 428/330; 428/446; 428/447; 428/448; 428/500; 250/483.1; 250/483.2

[58] Field of Search .............................. 250/483.1, 483.2; 428/447, 448, 500, 330, 409, 446

[56] References Cited

U.S. PATENT DOCUMENTS

| | | | |
|---|---|---|---|
| 3,776,754 | 12/1973 | Levinos | 430/28 |
| 4,090,085 | 5/1978 | Shimiya et al. | 250/483 |
| 4,188,449 | 2/1980 | Lu et al. | 428/314 |
| 4,246,485 | 1/1981 | Bossomaier et al. | 250/486.1 |
| 4,292,107 | 9/1981 | Tanaka et al. | 156/249 |
| 4,666,774 | 5/1987 | Cristini et al. | 328/330 |
| 4,773,920 | 9/1988 | Chasman et al. | 51/295 |
| 4,855,191 | 8/1989 | Arakawa et al. | 428/690 |
| 5,091,483 | 2/1992 | Mazurek et al. | 525/477 |
| 5,153,078 | 10/1992 | Kojima et al. | 428/690 |
| 5,164,224 | 11/1992 | Kojima et al. | 427/65 |
| 5,217,767 | 6/1993 | Gutman et al. | 428/35.3 |
| 5,296,117 | 3/1994 | De Jaeger et al. | 204/181.5 |
| 5,306,367 | 4/1994 | Suzuki et al. | 156/67 |
| 5,306,606 | 4/1994 | Kons | 430/533 |
| 5,308,687 | 5/1994 | East | 428/411.1 |
| 5,310,591 | 5/1994 | Dodge et al. | 428/195 |
| 5,411,806 | 5/1995 | Dahlquist | 428/411 |

FOREIGN PATENT DOCUMENTS

| | | |
|---|---|---|
| 0 175 578 | 3/1986 | European Pat. Off. . |
| 0 193 197 | 9/1986 | European Pat. Off. . |
| 0 377 470 | 7/1990 | European Pat. Off. . |
| 0 579 016 | 1/1994 | European Pat. Off. . |
| 593111 | 4/1994 | European Pat. Off. . |
| 2 399 683 | 3/1979 | France . |
| 2 500 467 | 8/1982 | France . |
| 06075333 | 3/1994 | Japan . |
| 06082959 | 3/1994 | Japan . |
| 06082969 | 3/1994 | Japan . |
| 06082981 | 3/1994 | Japan . |
| 94030881 | 4/1994 | Japan . |
| 94034120 | 5/1994 | Japan . |
| 2 017 139 | 10/1979 | United Kingdom . |
| WO 81/02866 | 10/1981 | WIPO . |

OTHER PUBLICATIONS

"Vapour–Deposited CsI:Na Layers, I. Morphologic and Crystallographic Properties," by A.L.N. Stevels and A.D.M. Schrama—de Pauw, Philips Res. Repts 29, 340–352, 1974.

"Vapour–Deposited CsI:Na Layers, II. Screens for Application in X–Ray Imaging Devices," by A.L.N. Stevels and A.D.M. Schrama—de Pauw, Philips Res. Repts. 29, 353–362, 1974.

"Tego RC Series," by Th. Goldschmidt AG, Aug. 1992.

*Primary Examiner*—Paul Thibodeau
*Assistant Examiner*—D Lawrence Tarazano
*Attorney, Agent, or Firm*—Amelia A. Buharin

[57] ABSTRACT

The performance of phosphor screens can be improved by adding an antistatic agent into the protective topcoat of the radiographic screen when the antistatic agent preferably comprises a fluorocarbon or silicone antistatic agent. These antistatic agents are particularly useful where the screen is made by coating phosphor dispersion/mixture onto a substrate while the dispersion/mixture contains less than 5% by weight of polymerizable components with a molecular weight less than 300, preferably with less than 5% by weight of polymerizable components having molecular weights less than 500, and a topcoat contains the antistatic agent. Formation of the antistatic topcoat is preferably formed by inclusion of the antistatic agent into the polymerizable composition and allowing the antistatic agent to migrate to the surface of the composition during polymerization to form a layer consisting essentially of the antistatic agent. The polymerizable composition should be photopolymerizable, and other components within the coating to be photohardened which have molecular weights below 300 or 500 should likewise be kept to less than 5% by weight of the composition.

5 Claims, No Drawings

RADIOGRAPHIC INTENSIFYING SCREEN WITH ANTISTAT

This is a continuation of application Ser. No. 08/658,768 filed Jun. 5, 1996, now abandoned, which is a divisional of application Ser. No. 08/319,812 filed Oct. 7, 1994, now U.S. Pat. No. 5,569,485.

BACKGROUND OF THE INVENTION

1. Field of the Invention

The present invention relates to intensifying phosphor screens for use in radiographic imaging, and particularly intensifying screens with antistatic agents therein.

2. Background of the Art

There are at least two critical objectives in the production of radiographic images, particularly in medical radiographic images. One desired aspect of radiographic imaging is, of course, the faithfulness of the generated image compared to the object through which radiation was passed during imaging. Another important aspect, particularly during medical radiographic imaging, is the reduction of the level of exposure of the object (patient) to radiation during the imaging process.

One significant means of reducing the level of X-ray exposure during imaging has been the use of "intensifying screens" during the imaging process. These screens usually comprise phosphors in a binder on a carrier layer. The phosphors absorb X-ray radiation at a higher efficiency than does silver halide which is normally used in the hard-copy output of radiographic images. The phosphors not only absorb X-rays at an efficient rate, but can also phosphoresce (or fluoresce), emitting radiation at a wavelength other than the wavelength of X-rays which the phosphor absorbed. Depending upon the chemical nature and properties of the phosphor, the emitted radiation may be at essentially any wavelength between and including the infrared and ultraviolet wavelengths of the electromagnetic spectrum. Silver halide naturally absorbs radiation in the ultraviolet and near blue wavelengths, and can be spectrally sensitized to efficiently absorb radiation in other portions of the ultraviolet, visible and the infrared regions of the electromagnetic spectrum. By exposing the phosphor screen to X-rays, having the phosphor screen emit in the UV, visible or infrared, and having a silver halide emulsion spectrally sensitized to the wavelength of emission of the phosphor screen and optically associated with the phosphor screen, the entire efficiency of the X-ray imaging system can be greatly enhanced. This allows for the use of lower doses of X-rays during exposure of the object.

The use of such phosphors is well known in the art as exemplified by such patents as U.S. Pat. Nos. 3,883,747 and 4,204,125 where there is direct emission of phosphorescent radiation upon X-ray stimulation, and U.S. Pat. Nos. 3,859,527 and 5,164,224 where there is exposure to X-rays, storage of the absorbed energy by the phosphor, and subsequent stimulation by stimulating radiation to cause the phosphor to emit the stored energy as UV to infrared radiation. These phosphor systems are commercially successful and provide a significant benefit to the radiographic art. In these types of systems, however, there is a trade-off between speed and sharpness. To absorb more x-rays and emit more light, the screen itself can be made thicker. But in this case, light generated within the thickness of the screen is scattered by the phosphor grains to a greater extent, thereby reducing the resulting image sharpness recorded on the film. Conversely, to improve sharpness a thinner screen is desirable, but this reduces the x-ray absorbing power, and ultimately requires a higher dosage to the patient or object being x-rayed.

Many methods of improving the image quality, particularly the sharpness of images generated from phosphor screens, without adversely affecting the sensitivity or speed of the system, have been proposed. Reflective particulates, dyes, pigments and other light affecting materials have been proposed as additives to phosphor layers to improve sharpness as shown in EPO 102 790 (powdered glass), Japanese Application 146,447/1980 (white pigments), Japanese Patent Application 163,500/1980 (colorants), and EPO 175 578 (sputtering or vacuum evaporation of phosphors).

The objective of these methods is primarily to provide a high concentration of phosphor in the active layer of the screen and provide a screen of uniform properties. U.S. Pat. No. 5,306,367 produces a storage phosphor screen by dispersing phosphor particles in a thermoplastic binder diluted with a solvent, then coats the mixture, dries to remove the solvent, and compresses the coating at a temperature above the melting point of the binder. U.S. Pat. No. 5,296,117 deposits phosphor particles in a binder by electrophoretic deposition of a dispersion of the phosphor particles in a solution of polymeric binder. The solution is coated onto a substrate, dried and the phosphor screen thus produced. Each of these types of systems has shown some benefits, but there is still significant room for improvement in the sharpness of radiographic phosphor screens. In particular, it is desired to eliminate complicated deposition processes which can be costly, to eliminate the use of solvents which are harmful to the environment, and to eliminate or reduce high processing temperatures.

Another problem with photographic imaging systems is static charges interfering with image quality or the ability to move the photographic media. The contact of the photographic medium with other surfaces during transportation or placement of the medium can cause static or tribolelectric charges to be created on the medium. These charges not only interfere with the physical movement of the film by causing attraction to surfaces which prevent slippage between the film and those surfaces, but the charges can also discharge as sparks which can create spurious images on the photographic medium.

Numerous antistatic layers and antistatic agents have been added to photographic media, especially graphic arts and radiographic photographic imaging media (industrial and medical photographic elements) to reduce the various types of static charging which can occur with these imaging materials. Although many of these antistatic layers, systems and additives can reduce various types of static buildup, each new system may have different physical requirements and need different antistatic protection. It is usually desirable for antistatic layers to be able to provide surface resistivity levels of less than $10^{13}$ ohms/square, more preferably less than $5\times10^{12}$ ohms/square, and more preferably less than $10^{12}$ ohms/square to assure better antistatic protection.

U.S. Pat. No. 4,666,774 discloses the use of antistatic agents in the oxidatively treated protective topcoat of a radiographic intensifying screen. Many different classes of antistatic agents are used in that topcoat layer.

U.S. Pat. No. 4,845,369 discloses a radiation image storage panel wherein at least one layer contains fibrous conductive material to reduce static buildup.

U.S. Pat. No. 5,151,604 discloses radiation storage phosophor panels which contain electroconductive zinc oxide whiskers in at least one layer to reduce static charging in the panel.

European Patent Application 0 377 470 A1 discloses radiation image storage phosphor panels in which at least one layer contains an antistatic agent comprising an inorganic salt of a metal.

Japanese Patent Publication 91-200731/27, JP94034120-B2 discloses the use of a fluorinated surfactant in a surface layer on a lead, absorbing X-ray screen to reduce static.

The need for antistatic protection in radiation image storage panels and intensifying screens has been recognized in the art. It would be particularly desireable to accomplish this antistatic protection without providing an additional coating to the surface of the screen, such as when the antistatic agents are included in a protective topcoat. It also would be desirable to produce screens or panels which provide antistatic protection by incorporation of antistatic agents which are resident in the surface of such screens. The antistatic topcoat is described as preferably comprising a lacquer applied to the surface of the element.

SUMMARY OF THE INVENTION

The present invention comprises a phosphor intensifying screen which contains particular antistatic agents in the screen. A particular method for manufacturing the screens comprises blending a phosphor in a hardenable system (i.e., that is, as defined herein, a polymerizable or curable system) comprising less than 5% each (or both) by weight of non-polymerizable organic materials (e.g., solvents) and polymerizable materials having a molecular weight less than 300 (preferably less than 500), coating said phosphor in a hardenable system onto a substrate, and polymerizing (i.e., hardening) said system. Preferably there will be less than 3% by weight of each (or both) of these lower molecular weight additives, more preferably less than 2% each (or both), and most preferably less than 1% by weight of each of these ingredients. The term polymerization is inclusive of curing or thermosetting which usually denotes three-dimensional polymerization. The antistatic agent will be present in the phosphor layer or in a layer adjacent to the phosphor layer (e.g., undercoating layer or protective topcoat layer). Preferably, the antistatic agent will be incorporated in the polymeric binder formulation, and migrate from the bulk and interior of the phosphor screen to enrich the surface of the screen prior to complete polymerization or hardening of the screen. The antistatic layers of the present invention should be able to provide those tradiational levels of antistatic protection as measured by surface reistivity which are desired in the art (e.g., less than $10^{13}$ ohms/square).

DETAILED DESCRIPTION OF THE INVENTION

Any stimulable or fluorescing phosphor which absorbs X-rays and emits radiation between 200 nm and 1100 nm can be used in the practice of the present invention. Normally those phosphors are to be provided into the coating compositions used in the practice of the present invention as particulates, particularly with average particle sizes between 0.3 and 50 microns, preferably between 0.5 and 40 microns, more preferably between 0.7 and 35 microns and most preferably between 1 and 30 microns. Amongst the many phosphors known in the art which may be considered in the practice of the present invention are alkali halides, doped alkali halides, rare earth oxy-halides, and others such as are described in U.S. Pat. No. 5,302,423 which is included herein by reference for its disclosure of phosphors. Other literature disclosing phosphors which are contemplated within the scope of the present invention include U.S. Pat. Nos. 4,258,264; 4,261,854; 5,124,564; 4,225,653; 4,387,141; 3,795,814, 3,974,389; 4,405,691, and the like.

A general discussion of antistatic agents can be found in the *Plastic Additives and Modifiers Handbook*, Chapter 70, pages 957–967, J. Edenbaum ed., Van Norstand Reinhold, N.Y., 1992. Antistatic protection may be provided by incorporation of highly conductive material into the bulk or a topcoat (i.e., metal particles or whiskers), or by the use of an antistatic agent applied either to the surface of a screen or present in the bulk and caused to migrate to the surface of the screen, which then becomes conductive. The antistatic agents which may be used in the practice of the present invention may be generally characterized by their ability to migrate to the surface of the polymeric binder composition during polymerization or cure of the binder.

The antistatic agent will invariably contain polar and nonpolar sections. It should be chosen so that the nonpolar section is similar in polarity (ie., similar solubility or interaction parameter) to the nonpolar part of the bulk binder composition. The polar section of the additive should be less polar (lower solubility parameter) than the polar part of the polymeric binder. With this configuration, the additive is likely to migrate to the surface, rather than being bound internally to the bulk, or to polar-filler (phosphor) particles. The polar group of the antistatic agent is chosen for its affinity for water.

Several types of antistatic agents are extant, including esters of a polyol, such as glycerol or sorbitol, with an aliphatic fatty acid. Examples of these polyol esters are available under the tradenames Hostastat™ (American Hoechst) and Markstat™ (Witco Chemical). Another class of antistatic agents comprise phosphate esters. A further class of surface antistatic agents are amine antistats, such as ethoxylated tertiary amines with the general structure, $$R—N(CH_2CH_2OH)_2$$

in which R— represents a relatively long-chain alkyl group. If R— is stearyl, the resultant bis(2-hydroxyethyl) stearylamine is of a suitable polarity balance for use in polyolefins. If, instead, R— represents tall-oil or coconut-oil fatty acids, the more polarizable product is suitable for styrenic polymers. When resident on the surface of the screen, the polar group develops a hydrogen bonded network with adsorbed water and permits electronic charge transfer.

A still further class of antistatic agents include organic-salt, such as quaternary amine salts. The simplest members of this family are of the structure $$(R)_4N^+X^-$$

where the four R— groups make up one long-chain alkyl residue, such as $C_{14}$–$C_{18}$, and three methyl or ethyl groups. The anion is typically methyl or ethyl sulfate, $(R—O—SO_3)^-$. Upon reaching the surface and moist air, these antistatic agents are in equilibrium with their hydrolysis products: teritary amine, methanol or ethanol, methyl or ethyl amine sulfate, aqueous sulfuric acid, and various recombinations. Under these conditions, the amines are probably converted to the corresponding highly polar amine oxides. The yield is a surface-bearing polar, ionic, hygroscopic soup, well adapted to charge dissipation.

Preferred antistatic agents are comprised of quaternary ammonium compounds, which exhibit an affinity for water molecules which in turn serve to lower the surface resistivity of the materials to which they are applied. The behavior of these antistatic agents within a solution is dependant on the overall composition of these compounds. Antistatic agents which are predominantly hydrocarbon based will tend to be soluble in the bulk with binder compositions which are predominantly hydrocarbon based. Upon hardening of the binder composition these hydrocarbon-based antistatic agents form a screen. It would be expected that the antistatic agent would not only reside on the surface of the screen, but also be uniformly distributed throughout the interior of the screen. To insure that the predominance of the antistatic agent resides on the surface of the screen (where it provides the most benefit toward dissipating accumulated static charge), the antistatic agent must be of an overall character that is incompatible with the polymerizable binder (i.e., has a sufficiently different surface energy from that of the surface energy of the bulk material that the lower surface energy material will preferrentially migrate to the surface). For a predominantly hydrocarbon binder, a silicone or fluorine based antistatic agent will preferentially migrate to the surface of the screen. Similarly, for a predominantly silicone based binder, a fluorine based antistatic agent will preferentially migrate from the bulk to the surface, whereas a silicone or hydrocarbon based antistat will more readily be assimilated into the bulk.

Any polymerizable material which forms a translucent or transparent binder (preferably transparent binder) upon polymerization can be used in the practice of the present invention as the binder for the phosphors. The binders may have to be particularly selected for use with individual phosphors as some polymerizable materials may react with active components in the phosphor, reducing or destroying its efficiency. Room temperature polymerizable and curable compositions, thermally polymerizable and curable compositions, and radiation curable and polymerizable compositions may be used within the practice of the present invention as long as the other defined characteristics of the invention are met. Thermally polymerizable or curable systems should be hardenable at moderate temperatures (e.g., temperatures which would not significantly impact the performance of the phosphors, which, depending upon the particular phosphors and resin combinations, would be less than 200° C., more preferably less than 150° C., and most preferably less than 125° C.) to reduce thermal stress or damage to the phosphor.

The prefered radiation curable silicon composition comprises an organopolysiloxane polymer or a mixture of organopolysiloxane polymers at least one of which has the following general formula:

I

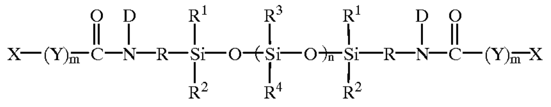

wherein:

X is an organic group having ethylenic unsaturation;

R and Y are independently divalent linking groups;

m is an integer of 0 to 1;

D is selected from hydrogen, an alkyl group of 1 to preferably no more than 10 carbon atoms, and an aryl group of up to 20 carbon atoms;

$R^1$ are monovalent substituents which can be the same or different and are selected from an alkyl group of up to 20 carbon atoms and an aryl group of up to 20 carbon atoms;

$R^2$ are monovalent substituents which can be the same or different and are selected from an alkyl group of up to 20 carbon atoms and an aryl group of up to 20 carbon atoms;

$R^3$ is a monovalent substituent which can be the same or different and is selected from an alkyl group of up to 20 carbon atoms and an aryl group of up to 20 carbon atoms;

$R^4$ is a monovalent substituent which can be the same or different and is selected from an alkyl group of up to 20 carbon atoms and an aryl group of up to 20 carbon atoms; and n is an integer of about 35 to about 1000.

As is well understood in this area, substitution is not only tolerated, but is often advisable and substitution is anticipated on the compounds used in the present invention. As a means of simplifying the discussion and recitation of certain terminology used throughout this application, the terms "group" and "moiety" are used to differentiate between chemical species that allow for substitution or which may be substituted and those which do not so allow or may not be so substituted. Thus, when the term "group" is used to describe a chemical compound or substituent, the described chemical material includes the basic group and that group with conventional substitution. Where the term "moiety" is used to describe a chemical compound or substituent, only an unsubstituted chemical material is intended to be included. For example, the phrase "alkyl group" is intended to include not only pure open-chain and cyclic saturated hydrocarbon alkyl substituents, such as methyl, ethyl, propyl, t-butyl, cyclohexyl, adamantyl, octadecyl, and the like, but also alkyl substituents bearing further substituents known in the art, such as hydroxyl, alkoxy, vinyl, phenyl, halogen atoms (F, Cl, Br, and I), cyano, nitro, amino, carboxyl, etc. On the other hand, the phrase "alkyl moiety" is limited to the inclusion of only pure open-chain and cyclic saturated hydrocarbon alkyl substituents, such as methyl, ethyl, propyl, t-butyl, cyclohexyl, adamantyl, octadecyl, and the like.

The silicone composition of the invention is represented by Formula I. An example of a preferred organolysiloxane comprises the organopolysiloxane of Formula I wherein X comprises

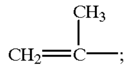

Y comprises

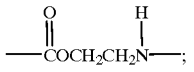

m=1; D=H; R comprises $—CH_2CH_2CH_2—$; and $R^1$, $R^2$, $R^3$ and $R^4$ each comprise $—CH_3$.

Acrylamidoamidosiloxane (herein also referred to as ACMAS) is another preferred embodiment. According to this embodiment ACMAS as defined by formula I has X comprising $CH_2{=}CH—$; Y comprising

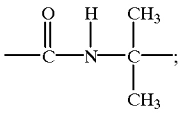

m=1; D=H; R comprising $—CH_2CH_2CH_2—$; and $R^1$, $R^2$, $R^3$ and $R^4$ each comprising $—CH_3$.

Another preferred organopolysiloxane comprises the organopolysiloxane of Formula I wherein X comprises $CH_2=CH—$; m=0, D=H, R comprises $—CH_2CH_2CH_2—$; and $R^1$, $R^2$, $R^3$ and $R^4$ each comprise $—CH_3$.

The hardenable or polymerizable material, when blended with the phosphors in forming the polymerizable compositions used in the practice of the present invention should contain less than 5% each by weight of non-polymerizable organic materials other than phosphors (particularly those having a molecular weight of less than 300, and more preferably less than 500, still more preferably less than 2,000, and most preferably having a molecular weight less than 5,000) and polymerizable ingredients having a molecular weight less than 300 or 500 (preferably less than 1,000, and more preferably having a molecular weight less than 2,000). The exact phenomenon by which improvements are provided by the practice of the present invention are not assured, but it may be a combination of such factors as greater uniformity in the distribution of the binder after polymerization, a higher packing density of the phosphor particles, less redistribution of ingredients within the phosphor layer due to substantial elimination of solvent migration out of the system, and reduced stress on the system by reduction of dimension changes during solidification of the phosphor layer.

Amongst the preferred polymerizable compositions are acrylates (including methacrylates, blends, mixtures, copolymers, terpolymers, tetrapolymers, etc., oligomers, macromers, etc.), epoxy resins (also including copolymers, blends, mixtures, terpolymers, tetrapolymers, oligomers, macromers, etc.), silanes, siloxanes (with all types of variants thereof), and polymerizable compositions comprising mixtures of these polymerizable active groups (e.g., epoxy-siloxanes, epoxy-silanes, acryloyl-silanes, acryloyl-siloxanes, acryloyl-epoxies, etc.). Acrylamidoamidosiloxanes have been found to be the preferred class of polymerizable component in the practice of the present invention. Particularly preferable acrylamidoamidosiloxanes (ACMAS) are described in U.S. Pat. No. 5,091,483 the contents of which is incorporated herein by reference for disclosure of these materials and their synthesis.

Conventional additives to the phosphor layer may be present in the practice of the present invention so long as the more critical characterizations of the required components are not violated. For example, brighteners, white pigments, reflective particulates, colorants, coating aids, antistats and the like may be present within the coating composition and the final phosphor layer so long as the other parameters of the invention are not exceeded. A particularly useful addition to the coating compositions are fluorocarbon containing antistatic agents such as perfluoroalkylsulfonamidopolyether derivatives. Preferred agents include addition products of perfluoroalkylsulfonyl fluoride, e.g., FX-8, and polyether diamines, e.g. Jeffamine™ ED-series, as described in U.S. Pat. No. 5,217,767. Another particularly useful addition to the coating composition are property modifying agents such as reactive silicones, which are used as hardness modifiers (available from Th. Goldschmidt AG).

A preferred method for manufacturing the phosphor screens according to the present invention comprises the steps of blending the phosphor and binder (and optional ingredients) to form a coating mixture comprising less than 5% each by total weight of non-polymerizable organic components and polymerizable components having a molecular weight of less than 300 or 500, coating the mixture onto a substrate, covering the substrate with a smooth layer (optional) or a microtextured layer (optional) thereby forming a laminate or a surface with controlled roughness, and polymerizing said composition (stripping said optional cover layer). Most preferably the composition is radiation curable (e.g., with photoinitiators present in the composition, but not included in determining the total weight of that layer for assessing concentrations of lower molecular weight materials) and polymerization is effected by irradiation.

The present invention is particularly effective while using microtextured cover sheets, which impart texture to the screen surface when the sheet is removed from the polymerized composition. This microtexturing can serve to prevent "blocking" (i.e. non-uniform sticking) of the screen and x-ray film, by providing a smaller contact surface along with sufficient channels for air bleed during lamination of the screen to the film. Typically, the surface features imparted by texturing range up to 25 microns in height, created by using a microtextured cover sheet with features up to 25 microns in depth.

It is also practical in the present invention to produce 'prestructured' phosphor screens, that is screens with a built-in raster orientation of the phosphor so that stimulation of the screen, when used in a storage phosphor mode, can be effected by an entire surface irradiation rather than by only a point-by-point irradiation by stimulating radiation. This can be accomplished by etching the desired pattern of phosphor distribution onto the surface of a carrier element, the pattern usually being columns and rows of closely spaced dots, and then filling the pattern with the compositions of the invention, and then hardening the composition of the invention within the pattern. The composition may be applied to the patterned surface by conventional coating processes (e.g., curtain coating, roller bead coating, knife edge coating, spin coating, extrusion coating, sheet coating, etc.) and the excess wiped off so that essentially only the pattern and not the flat surface is coated with the composition.

The phosphor screens produced according to the present invention are characterized by a high phosphor grain loading (phosphor to binder ratios in excess of 6:1, preferably at least 8:1, more preferably at least 10:1 and most preferably 10:1–18:1), high viscosity of the binder formulation due to the absence of viscosity reducing monomers or solvents, and resulting high phosphor packing density in the cured screen.

The preferred procedure for producing the phosphor screens of the present invention can be summarized as a series of four distinct steps. The components of the photopolymer mixture and the phosphor particles are weighed out and blended together, for example by successive passes through a commercially available 3-roll mill, such as a paint mill. Typically, several passes of the mixture through the mill are required to homogeneously blend the material. The blended mixture is then dispensed onto a suitable substrate, and a cover sheet is preferably applied over the mixture, producing a laminated or covered structure to protect the material from subsequent processing steps. The cover sheet may be any material which does not bond to the phosphor layer during hardening. Sheets with release coatings thereon (e.g., paper or film with low-adhesion coatings of silicone resins or fluorocarbon resins) are preferred. It is possible to use a very thin cover sheet which will bond to the phosphor layer and use that as a protective cover layer and/or release surface on the phosphor, but other means of applying such layers are preferred. The laminate is then passed through a series of rollers at ever decreasing gap space, so that the final desired thickness of the phosphor is obtained. The laminate is then cured either thermally, or by using either ultraviolet or electron-beam radiation, and the cover sheet is removed to expose the final phosphor screen. The cover sheet may remain on the surface during exposure if it is transparent, does not bond to the phosphor layer surface, or is intended to bond to the phosphor layer surface. The prefered method of providing, securing, forming or supplying the antistatic top coat layer is by having the antistatic component exude or migrate to the surface or otherwise leave the bulk of the coating phosphor composition during polymerization. The antistatic layer may be added as a separate step, but this is less prefered. If added as a separate step, the thickness of the coating is preferably less than 8 micrometers, more preferably less than 5 micrometers and most preferably between 0.02 and 2 micrometers.

TRIMAX (3M Company) radiographic screens are designated by grades T2, T6, T16, etc. The lower the "T" number, the higher the resolution, the slower the speed, and the finer the particulate size of the phosphor which makes up the screen. The object in radiography is to minimize the exposure to x-rays (faster speed), while obtaining the highest resolution possible. The comparative examples which will follow compare standard commercial screen performance to the performance of the screens of this invention.

There are several measurements which are made on the x-ray film image during the comparison of the performance of the phosphor screens. The optical density is measured using a commercially available optical densitometer. A silver halide emulsion will develop to some extent without exposure to x-rays, without exposure to any radiation (because of fog centers in the silver halide) or with exposure to x-rays without an associated phosphor layer due to absorption of x-rays by the silver halide grains (fog). The x-ray dosage for comparison of phosphor screens is set to a value to achieve an optical density of "1 over fog" (e.g., if the optical density of a fogged film is 0.24, the dosage will be set to achieve an optical density when using a screen, of 1.24).

The relative speed of the phosphor screen and film combination is a measure of how efficiently the film is exposed to achieve the required optical density, i.e., how much dosage is required. In the examples, this relative speed is the dosage required by a standard screen divided by the dosage required by a screen of the present invention, to obtain the optical density of "1 over fog."

The CTF (Contrast Transfer Function) is a measurement used in the industry to quantify the resolving power exhibited by the x-ray image. As features to be imaged decrease in size, the scattering of the radiation converted by the phosphor screen becomes more significant. For example, two small features in close proximity will often appear as a larger indistinct feature since the scattering from the phosphor layer merges information from each of the smaller features. The CTF can be used as a way to quantify the qualitative clarity of an x-ray image as practiced by the radiologist. The CTF is a function of line pairs resolved per millimeter, and as used in this discussion, it is defined by the quotient of (the difference in the optical density of the dark and light areas of the measured line pair) and (the difference in the optical density of the dark and light regions of the largest line pair). Optical density measurements used in the determination of the CTF of a film/screen combination are obtained by using a microdensitometer. The maximum CTF is equal to 1.0, and screens with a better resolving power will have a higher CTF.

COMPARATIVE EXAMPLE 1

TRIMAX T2 and TRIMAX T6 phosphor screens (3M Company, St. Paul, Minn.) were exposed conventionally using XD/a+ radiographic film (3M Company, St. Paul, Minn.) and a standard target. The conditions of exposure and resulting measured CTF are summarized below. The exposure of a film without having an associated phosphor screen yielded an optical density of 0.29. The applied dose was adjusted to yield an optical density for all exposures of 1.29 (a "1 over fog" condition).

| Trimax Phosphor Screen | kVp | Dose mR | CTF @2 lp/mm | CTF @4 lp/mm | CTF @6 lp/mm |
|---|---|---|---|---|---|
| T2 | 40 | 3.45 | 0.70 | 0.39 | 0.18 |
| T2 | 60 | 2.137 | 0.6 | 0.33 | 0.15 |
| T2 | 80 | 1.215 | 0.43 | 0.14 | — |
| T6 | 40 | 1.82 | 0.67 | 0.28 | — |
| T6 | 60 | 0.879 | 0.49 | 0.19 | 0.04 |
| T6 | 80 | 0.501 | 0.32 | 0.09 | — |

EXAMPLE 1

A phosphor screen comprising T6 Trimax phosphor particles (3M Company, St. Paul, Minn.) and a radiation curable binder, was formulated having a phosphor to binder ratio of approximately 12:1. A mixture of 31.35 grams of T6 TRIMAX phosphor particles; 1.6 grams of acrylamidoamidosiloxane polymerizable material (ACMAS) comprising 50% by weight of 35,000 molecular weight acrylomidoamidosiloxane, 50% by weight of 10,000 molecular weight acrylomidoamidosiloxane with 0.5% Darocure™ 1173 (free radical initiator from EM Industries) added to the mixture; 0.9 grams of a hardness modifier comprising 25 parts by weight TEGO RC726, 25 parts by weight TEGO RC711 (both from Th. Goldschmidt AG), and 1 part by weight Darocure™ 1173 (mixture designated by 711/726/1173); and 0.11 grams of functionalized Jeffamine™ antistatic agent (FX-8 derivative of Jeffamine™ ED-900, prepared according to the method described in U.S. Pat. No. 5,217,767, perfluorooctanesulfonyl fluoride, having a molecular weight of –502), was placed in a 3-roll mill. The gap between the first two rolls was adjusted to 0.005 inches (0.127 mm), and the gap between the second and third roll was set to 0.002 (0.051 mm) inches. The rotational speed of the first roll was 3 rpm, the second roll was rotated at 9 rpm, and the third roll at 28.25 rpm. The mixture was passed through this mill 10 times before removing from the mill and spreading onto a 0.007 (0.18 mm) inch thick polyester substrate. A 0.0023 (0.058 mm) inch thick polyester cover sheet was placed over the mixture to form a laminate, which was then passed through a pair of rollers initially gapped to 0.0243 inches (0.06 mm), resulting in a coating thickness within the laminate of 0.015 inches (0.38 mm). The gap between the rollers was then decreased by approximately 0.003 inches (0.076 mm) and the laminate again passed through the rollers to further compress the mixture. This step was repeated until the resulting coating thickness was 0.004 inches (0.10 mm) or 0.005 inches (0.127 mm). The laminate was then cured using ultraviolet light, and the cover sheet removed. A second screen of each thickness was made using the same procedure as above, like screens were placed on opposite sides of a commercial x-ray film (XD/A+ film, 3M company) with the phosphor layer in contact with the film surface, forming a screen/film/screen laminate, and an exposure mask was placed over the top phosphor screen.

Exposure Data

| kVp | Dose mR | Mils Thick Top/Bot | CTF @2 lp/mm | CTF @4 lp/mm | CTF @6 lp/mm | speed above T2 std |
|---|---|---|---|---|---|---|
| 40 | 1.126 | 4/4 | 0.64 | 0.32 | — | 3.06 |
| 40 | 1.346 | 5/5 | 0.69 | 0.25 | 0.12 | 2.56 |
| 60 | 0.680 | 4/4 | 0.56 | 0.27 | — | 3.14 |
| 60 | 0.688 | 5/5 | 0.46 | 0.13 | 0.01 | 3.11 |

EXAMPLE 2

A phosphor screen comprising T6 TRIMAX phosphor particles (3M Company, St. Paul, Minn.) and a radiation curable binder, was formulated having a phosphor to binder ratio of approximately 9:1. The same method as described in Example 1 was used, however the formulation of the mixture was as follows:

23.5 grams Trimax T6 Phosphor 1.6 grams ACMAS blend as in Example 1

0.9 grams 711/726/1173

0.11 grams functionalized Jeffamine™ antistat

Two different thicknesses of screens were made with this formulation using the procedure outlined in Example 1: one set of screens having a thickness of 0.003 inches (0.076 mm), and another set of screens having a thickness of 0.005 inches (0.127 mm). A screen/film/screen laminate was formed as in Example 1, and exposed to X-rays.

Exposure Data

| kVp | Dose mR | Mils Thick Top/Bott | CTF @2 lp/mm | CTF @4 lp/mm | CTF @6 lp/mm | speed above T2 std |
|---|---|---|---|---|---|---|
| 40 | 1.558 | 3/3 | 0.73 | 0.42 | 0.25 | 2.21 |
| 40 | 1.462 | 5/5 | 0.70 | 0.31 | 0.16 | 2.36 |
| 60 | 0.793 | 3/3 | 0.58 | 0.31 | 0.15 | 2.69 |
| 60 | 0.739 | 5/5 | 0.51 | 0.21 | 0.12 | 2.89 |

| kVp | Dose mR | Mils Thick Top/Bott | CTF @2 lp/mm | CTF @4 lp/mm | CTF @6 lp/mm | speed above T6 std |
|---|---|---|---|---|---|---|
| 80 | 0.442 | 3/3 | 0.50 | 0.21 | 0.10 | 1.13 |
| 80 | 0.365 | 5/5 | 0.38 | 0.12 | 0.05 | 1.37 |

EXAMPLE 3

A phosphor screen comprising T6 Trimax phosphor particles (3M Company, St. Paul, Minn.) and a radiation curable binder, was formulated having a phosphor to binder ratio of approximately 12:1. The same method as described in Example 1 was used, however, TEGO RC715 was substituted for TEGO RC711, and the rest of the formulation was as follows:

31.2 grams Trimax T6 Phosphor 1.60 grams ACMAS blend as in Example 1

0.9 grams 715/726/1173

0.1 grams functionalized Jeffamine™ antistat

One set of screens with this formulation was made using the procedure outlined in Example 1, each screen having a thickness of 0.004 inches (0.11 mm). A screen/film/screen laminate was formed as in Example 1, and exposed to X-rays.

Exposure Data

| kVp | Dose mR | Mils Thick Top/Bott | CTF @2 lp/mm | CTF @4 lp/mm | CTF @6 lp/mm | speed above T6 std |
|---|---|---|---|---|---|---|
| 80 | 0.367 | 4/4 | 0.41 | 0.14 | — | 1.37 |

Comparison of the data of Examples 1–3, with the standard screen data presented in Comparative Example 1 clearly shows that with proper choice of the thickness of the screen and phosphor to binder ratio, at 40 kVp the CTF of the inventive screen Is comparable or higher at every resolution (1 p/mm) than a T2 screen at over double the speed, and that at 60 kVp the screen has comparable resolution to a T2 screen again at over double the speed. Similar comparisons are made on penetrations of 60 and 80 kVp with a T6 screen, where comparable or higher CTF values are associated with the faster inventive screen.

There are a wide range of variables that can be considered in comparing the performance of the inventive screens herein described, in particular there is a tradeoff between the speed and the resolving power of the screen, and each is dependant on the type and granular size of the phosphor, the phosphor to binder ratio, and the thickness of the screen. It has been shown that the inventive screen described herein exhibits the resolving power of a standard screen while at a much improved speed, or a higher resolving power at the same speed, which in turn leads to a lower dose of x-rays to which a patient is exposed in order to obtain the necessary information required by the physician.

What is claimed is:

1. A radiographic intensifying screen comprising a substrate, a phosphor layer on said substrate, and a topcoat over said phosphor layer, said phosphor layer comprising an x-ray converting phosphor in a cured polymeric binder, and said topcoat layer consisting of an antistatic agent exuded from said cured polymeric binder wherein said antistatic agent selected from the group consisting of esters of polyol with an aliphatic fatty acid, phosphate esters, ethoxylated tertiary amines, quaternary ammonium compounds, and fluorine containing antistatic agents.

2. The radiographic intensifying screen of claim 1 wherein the antistatic agent is incompatible with the polymeric binder.

3. The radiographic intensifying screen of claim 1 wherein the antistatic agent is a fluorine containing compound and the polymeric binder comprises silicon.

4. An improved radiographic intensifying screen comprising:

a substrate; and a phosphor layer on said substrate, wherein said phosphor layer comprises an x-ray converting phosphor in a polymeric binder, wherein the improvement comprises an exuded antistatic layer on the phosphor layer, said antistatic layer selected from the group consisting of esters of polyol with an aliphatic fatty acid, phosphate esters, ethoxylated tertiary amines, quaternary ammonium compounds, and fluorine containing antistatic agents.

5. An improved radiographic intensifying screen comprising:

a substrate; and a phosphor layer on said substrate, wherein said phosphor layer comprises an x-ray converting phosphor in a silicon containing polymeric binder, wherein the improvement comprises an exuded antistatic layer on said phosphor layer, said antistatic layer consisting of a fluorine containing antistatic agent.

* * * * *